United States Patent [19]

Lorence et al.

[11] Patent Number: 5,060,899
[45] Date of Patent: Oct. 29, 1991

[54] NESTED CONTAINER HOLDERS

[75] Inventors: Brian S. Lorence, Warren; Jeffrey A. Weidman, Sterling Heights; Richard A. Phelps, Ferndale, all of Mich.

[73] Assignee: Chivas Products Limited, Sterling Heights, Mich.

[21] Appl. No.: 615,831

[22] Filed: Nov. 19, 1990

[51] Int. Cl.⁵ ............................................. A47K 1/08
[52] U.S. Cl. ........................... 248/311.2; 224/42.45 R; 297/188; 297/194
[58] Field of Search .............. 248/311.2, 146; 220/18, 220/85 H; 297/194, 188; 224/42.45 R, 281; 108/44, 26; 296/37.8; 211/74, 75; 312/242

[56] References Cited

U.S. PATENT DOCUMENTS

| | | |
|---|---|---|
| 2,000,916 | 5/1935 | Bloom . |
| 2,526,793 | 10/1950 | Alfred . |
| 2,708,062 | 5/1955 | Poyer . |
| 2,905,421 | 9/1959 | O'Connor ..................... 248/186 X |
| 3,039,616 | 6/1962 | Proffit . |
| 3,136,578 | 6/1964 | Tihovici . |
| 3,215,467 | 11/1965 | McFarland et al. . |
| 3,338,629 | 8/1967 | Drees . |
| 3,497,076 | 2/1970 | O'Brien . |
| 3,606,112 | 9/1971 | Cheshier . |
| 3,637,184 | 1/1972 | O'Brien ........................... 312/242 X |
| 3,784,142 | 1/1974 | O'Brien . |
| 3,899,982 | 8/1975 | Fetzek . |
| 4,040,659 | 8/1977 | Arnold . |
| 4,071,175 | 1/1978 | Wagnon . |
| 4,417,764 | 11/1983 | Marcus et al. . |
| 4,453,759 | 6/1984 | Kathiria . |
| 4,530,480 | 7/1985 | Pratt . |
| 4,733,908 | 3/1988 | Dykstra ................................ 297/194 |
| 4,738,423 | 4/1988 | DiFilippo et al. . |
| 4,783,037 | 11/1988 | Flowerday . |
| 4,792,174 | 12/1988 | Shioda . |
| 4,792,184 | 12/1988 | Lindberg et al. . |
| 4,818,017 | 4/1989 | Dykstra et al. . |
| 4,826,058 | 5/1989 | Nakayama . |
| 4,828,211 | 5/1989 | McDonnell et al. . |
| 4,854,536 | 8/1989 | Lorence .......................... 297/194 X |
| 4,892,281 | 1/1990 | Difilippo ........................... 248/311.2 |
| 4,907,775 | 3/1990 | Lorence et al. . |
| 4,927,108 | 5/1990 | Blazic ................................. 224/281 |
| 4,928,865 | 5/1990 | Lorence et al. . |
| 4,943,111 | 7/1990 | Laan ................................. 248/311.2 |
| 4,953,771 | 9/1990 | Fischer ............................ 297/194 X |
| 4,955,571 | 9/1990 | Lorence .......................... 248/311.2 |

Primary Examiner—J. Franklin Foss
Attorney, Agent, or Firm—Townsend & Townsend

[57] ABSTRACT

This invention provides concealable cupholders (3, 5) with several beneficial aspects. Conveniently, the cupholders may be activated by actuating a push-to-release catch (24, 25) so that the cupholders move outwardly in a controlled manner from a housing with the appearance that it is being driven by an electric motor. The cupholders overlap one another in a compact manner within the housing. When moved out of the housing the cupholders may be maintained in the overlapping position such that they jointly support a single beverage or, alternatively a release mechanism (30) may be activated, by the use of, for example, a kick-out spring (10) to permit the secondary cupholder (5) to pivot to a position substantially disposed away from the primary cupholder (3) such that both cupholders may support different containers.

20 Claims, 3 Drawing Sheets

NESTED CONTAINER HOLDERS

BACKGROUND OF THE INVENTION

This invention relates to beverage container holders generally and, in particular, to beverage container holders which may hold more than one beverage and which may be moved from a concealed, inoperative storage position to an operative storage position.

Conceivable container holders are known in the art. They are particularly useful in motor vehicles, where space is at a premium. When not in use, the container holder may be stored in a dash board or arm rest, thereby freeing the space occupied by the container holder. Because available storage space for the container holder is limited, the container holder must have a compact storage shape. Minimizing the storage size of container holders is particularly important when the unit is designed to hold multiple containers.

SUMMARY OF THE INVENTION

This invention provides concealable container holders with several beneficial aspects. Conveniently, the container holders may be activated by pressing on a push to release catch so that the cupholder moves outwardly in a controlled manner from a housing with the appearance that it is being driven by an electric motor. The container holders may also include a primary and a secondary cupholder, one overlapping the other in a compact manner within the housing. When moved out of the housing the cupholders may be maintained in the overlapping position such that they jointly support a single container. Alternatively, a release mechanism may be activated by the use of, for example, a kick-out spring, to permit the secondary cupholder to pivot to a position substantially disposed away from the primary cupholder such that both cupholders may support different containers.

The container holders of this invention may be advantageously used in motor vehicles, aircraft or sailing vessels and ships as they are easily concealed, stable and compact. When a rack and pinion viscous dampener release mechanism is used, the cupholder unit moves into an operative position with minimal effort and with controlled, smooth movement.

The invention will be more particularly described with reference to the drawings.

DESCRIPTION OF THE PREFERRED EMBODIMENT

Figure 1A:
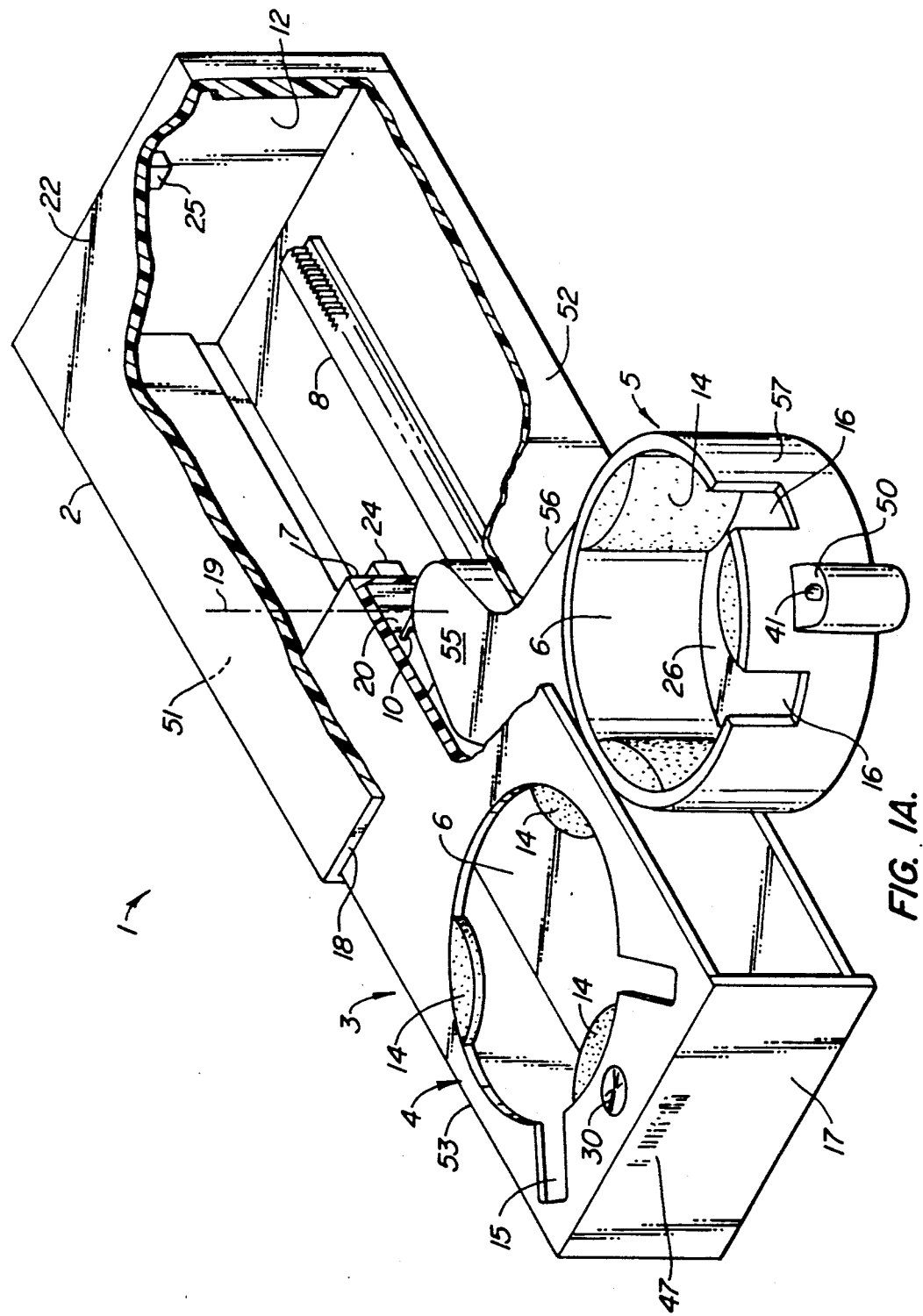
FIG. 1A is a perspective view of a container holder assembly with the primary and secondary cupholders in a dual operative position.
Figure 1B:
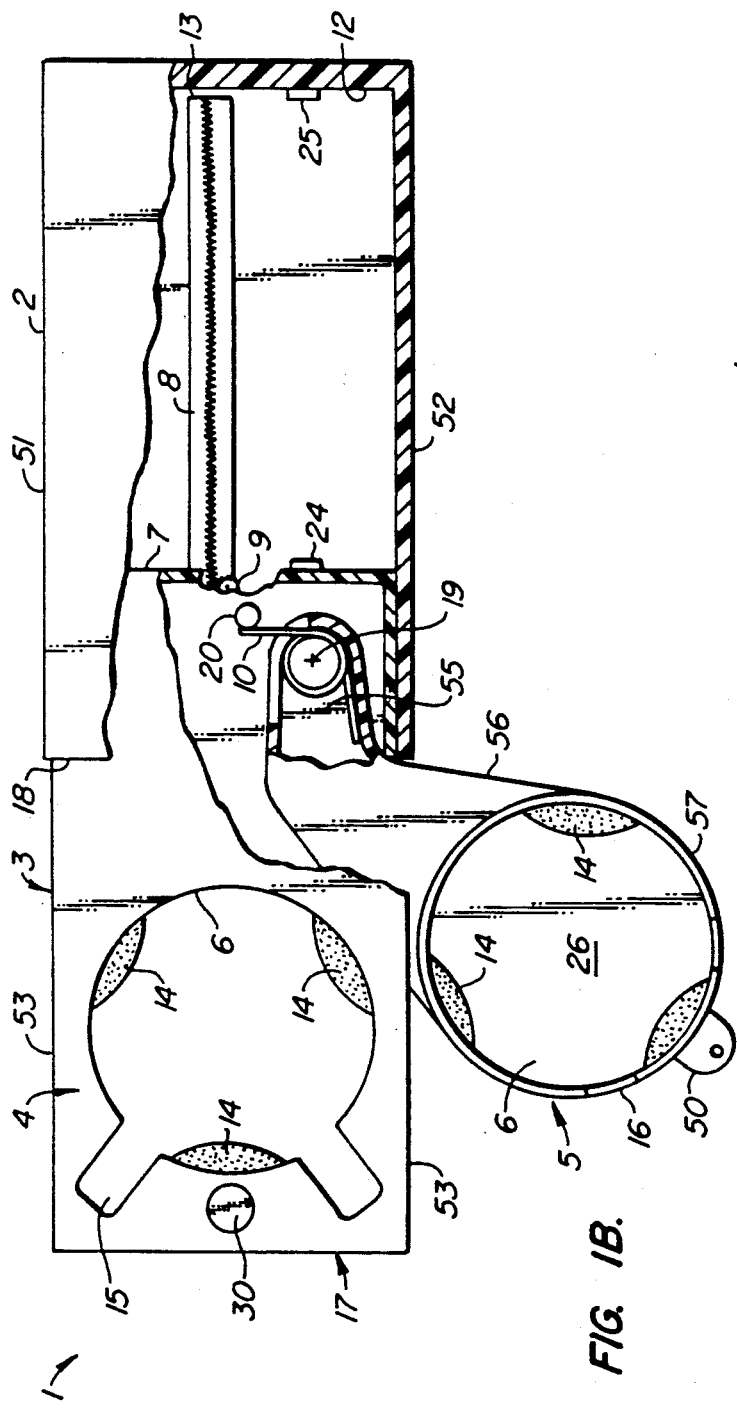
FIG. 1B is a plan view of the assembly in FIG. 1A.
Figure 2:
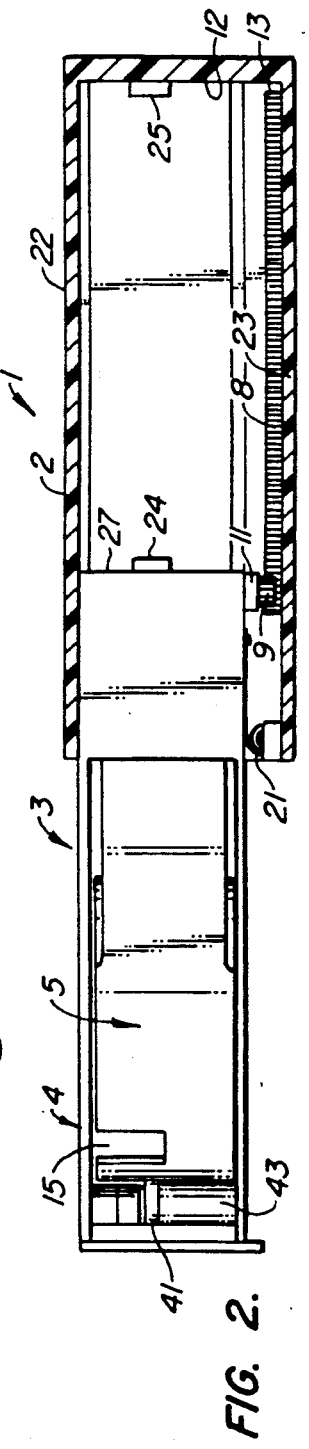
FIG. 2 is a right side elevation view of the container holder assembly of FIG. 1 in an operative position with the cupholder unit external to the housing with the primary and secondary cupholders in an overlapping position.

The preferred embodiment of this invention is shown in FIGS. 1-4. The container holder assembly 1 is boxlike, as illustrated in FIGS. 1 and 2, and has a front 18, a back 12, a top 22, a bottom surface 23, a right side 52 and a left side 51. Mounted in the container holder assembly 1 is a cupholder unit 3 which is also boxlike and also has a front 17 and a back 7, and a bottom surface with two side segments 53 connecting the front and the back. The cupholder unit comprises a primary cupholder 4 and a secondary cupholder 5. The primary cupholder has a substantially circular cupholder aperture 6 with rubber gaskets 14 disposed within the aperture for supporting a container disposed therein. Preferably there will be three rubber gaskets. Preferably also, the circular cupholder aperture 6 will have two substantially rectangular extensions 15 which extend from the circular portion of the aperture into the cupholder unit such that a cup handle may be placed therein. A push indicia 47 is disposed at the front 17 of the cupholder unit and a button 30 is disposed on the top of the cupholder unit between the cupholder aperture 6 and the front of cupholder unit 17.

Figure 3:
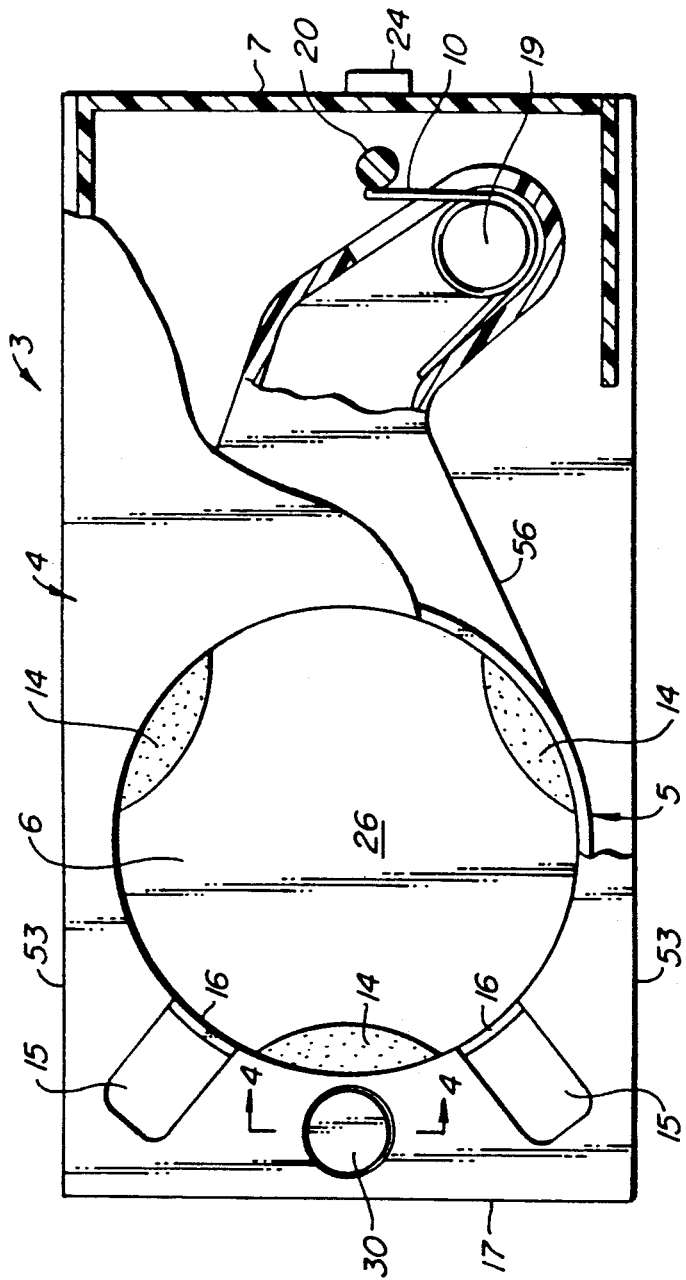
FIG. 3 is a top plan view of the cupholder unit of FIG. 2.
Figure 4:
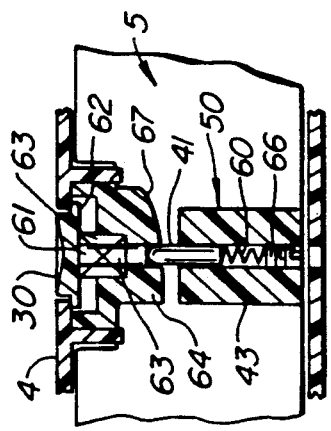
FIG. 4 is a cross-sectional view taken along line 4—4 of FIG. 3 illustrating the release mechanism for the secondary cupholder.

FIG. 4 is a cross sectional view taken along line 4—4 of FIG. 3 illustrating the apparatus which lies below button 30. In contact with button 30 at the central portion of the button and projecting downward therefrom is shaft 61. Bearing 63 surrounds shaft 61 in a substantially cylindrical manner. Shaft 61 and bearing 63 are further disposed within a cylindrical portion of a central portion of catch housing 64 which is free from button 30. A camming surface 67 is present at one edge of the catch housing 64. Button 30 has flanges 62 disposed at opposite ends of the button which lie beneath the top of the primary cupholder.

Cupholder unit 3 is connected to housing 2 of container holder 1 by rack 8 and pinion 9 which are disposed between the bottom surface of the cupholder unit and the bottom surface 23 of the container holder 1 such that rack 8 runs substantially along the bottom surface 23 of container holder 1. Pinion 8 is disposed within viscous pot 11. In addition a conventional push-to-release catch allows cupholder unit 3 to be optionally placed in a concealed position within housing 2. One portion 24 of push-to-release catch is attached to the back 7 of cupholder unit 3. A second portion 25 of the push-to-release catch is located at the back wall 12 of housing 2. Further connecting cupholder unit 3 to housing 2 is flat coil spring 21. Flat coil spring 21 is disposed beneath cupholder unit 3 and substantially towards the front of housing 2 in contact with the bottom surface 23 of the container holder. Spring 21 tends to drive cupholder unit 3 towards the external position of FIGS. 1 and 2.

The cupholder unit further comprises a secondary cupholder 5 with a dog leg-shaped frame 56 having a large curved edge 57 towards the front 17 of the cupholder unit and a small curved portion 55 towards the back 7 of cupholder unit 3. Secondary cupholder 5 also has a top and a bottom surface and is disposed within primary cupholder 4. The top surface comprises a cupholder aperture 6 with rubber gaskets 14 and cuphandle slots 16. At the small curved portion 55 of secondary cupholder 5, the secondary cupholder unit is connected to the primary cupholder unit via pivot 19. Disposed around pivot 19 is kickout spring 10 biased against a support 20. Further disposed at the front of secondary cupholder 5 is pin mount 43, a small extension of the secondary cupholder, having a hole 65 sized and positioned for engagement with pin 41.

Hole 65 of pin mount 43 (see FIG. 4) houses a spring 60 between a plug 66 and a pin 41. Pin 41 is mounted at the end of spring 60 that is closest to the top of the primary cupholder 4.

Cupholders 4 and 5 may be concealed within the housing or may slide out as a drawer for use. FIG. 3 illustrates the position of the cupholders 4 and 5 outside of housing 2 in their overlapping position. In the preferred embodiment, the secondary cupholder 5 is encased within the primary cupholder 4. The cupholder unit 3 comprising cupholders 4 and 5 may be moved to an operative position substantially external to the top surface 22 and bottom surface 23 of the housing 2 as illustrated in FIG. 2 by pressure on push indicia 47 to disengage a conventional push-to-release catch (24 and 25) which secures cupholder unit 3 within housing 2.

Pressing on the push indicia of primary cupholder 4 permits the cupholder unit 3 to move to the external operative position shown in FIGS. 1 and 2 under the influence of flat coil spring 21 secured to the housing. The movement of cupholder unit 3 is regulated by the rack and pinion viscous dampener mechanism. Any known rack and pinion viscous dampener mechanism known suitable for drawers, electronic equipment or the like may be used. An appropriate dampener mechanism may be obtained commercially from ITW Deltar Special Products Division of Frankfurt, Illinois. The mechanism illustrated here comprises pinion 9 mounted to a viscous pot 11 which slows down and regulates the movement of pinion 9 as it rolls along rack 8. The resulting movement creates a visual impression that the cupholder unit 3 moves outwardly in a controlled manner under the biasing action of spring 21.

The viscous dampener mechanism thus provides a sliding mount means for permitting cupholder unit 3 to move axially from a first position substantially internal to the top surface 22 and bottom surface 23 of the housing 2 to a second position substantially external to the top and bottom surface of housing 2.

In the preferred embodiment, a pivoting mount means is mounted to primary cupholder 4 for permitting secondary cupholder 5 to rotate about an axis from one position such that both cupholders substantially overlap (see FIG. 2) to a second position substantially disposed away from primary cupholder 4 so that both cupholders may support different containers in a substantially upright manner (see FIG. 1).

The pivoting mount means in the preferred embodiment includes the engagement of kick-out spring 10 in contact with secondary cupholder 5 by pressing on button 30 located on primary cupholder 4 at the top of cupholder unit 3, FIGS. 1 and 3. Button 30 interacts with pin 41 mounted in pin mount 43 on spring 60 until pin 41 disengages from primary cupholder 4 allowing secondary cupholder 5 to pivot from a fixed position within primary cupholder 4 to a position substantially disposed away from primary cupholder 4 as in FIG. 1. Camming surface 67 guides pin 41 in and out of hole 65.

When in the extended position shown in FIG. 1, cupholders 4 and 5 are oriented to support in a substantially upright position containers placed in each cupholder aperture 6. Rubber gaskets may be employed within cupholder aperture 6 to further secure a container supported by cupholder 4 or 5. At least one rubber gasket may be used; the use of three gaskets as indicated in FIG. 1 is convenient and effective.

In alternative embodiments the secondary cupholder may be alternatively disposed encased within the primary cupholder as in the preferred embodiment or disposed above or below the primary cupholder when the cupholder unit is in its concealed position.

In the preferred embodiment, springs 10, 21 and 60 are formed from spring steel.

The entire container holder assembly 1 is preferably formed from injection molded plastic, although other materials may also be used.

Other modifications of this invention will be apparent to those skilled in the art.

What is claimed is:

1. A container holder comprising:
  a housing having a top surface and a bottom surface;
  a primary cupholder and a secondary cupholder disposed within the housing each having holder means for supporting a container disposed therein, the cupholders further having means for movably mounting both cupholders within the housing, the means for movably mounting comprising sliding mount means for permitting the cupholders to move together axially from a first position substantially internal to the top and bottom surface of the housing to a second position substantially external to the top and bottom surface of the housing; and
  pivoting mount means in contact with both cupholders for permitting the secondary cupholder to rotate about an axis from a third position where both cupholders substantially overlap to a fourth position substantially disposed away from the primary cupholder such that both cupholders may support different containers.

2. The container holder of claim 1 wherein the sliding mount means comprises a rack and pinion mechanism secured to the housing.

3. The container holder of claim 2 wherein the pinion is mounted to a viscous pot.

4. The container holder of claim 1 wherein the pivoting mount means is engaged by a release mechanism affixed to the primary cupholder.

5. The container holder of claim 4 wherein the release mechanism is activated by a push button on the primary cupholder.

6. The container holder of claim 4 wherein the pivoting mount means includes a kick-out spring in contact with the secondary cupholder.

7. The container holder of claim 4 wherein the release mechanism comprises a movable button secured to the primary cupholder and a pin mounted on a spring secured to the secondary cupholder which interacts with the button when the secondary cupholder is in the third position.

8. The container holder of claim 1 wherein the holder means for the primary and secondary cupholders further comprise at least one rubber gasket for securing a container within the cupholders.

9. The container of claim 1 wherein the sliding mount means includes a flat spring secured to the housing.

10. The container holder comprising:
  a housing having a top surface and a bottom surface;
  a primary cupholder and a secondary cupholder disposed within the housing each having holder means for supporting a container disposed therein, the primary cupholder further having means for movably mounting the primary cupholder within the housing, the means for movably mounting comprising:
  sliding mount means for permitting both cupholders to move together axially from a first position substantially internal to the top and bottom surface of the housing to a second position substantially external to the top and bottom surface of the housing wherein said means comprises a rack and pinion viscous dampener mechanism; and pivoting mount means in contact with both cupholders for permitting the secondary cupholder to rotate about an axis from a third position where both cupholders substantially overlap to a fourth position substantially disposed away from the primary cupholder such that both cupholders may support different containers.

11. The container holder of claim 10 wherein the sliding mount means is engaged by pushing the cupholder at a front surface of the cupholder.

12. The container holder of claim 10 wherein the primary and secondary cupholders are disposed so that one substantially overlaps the other when in the first position.

13. The container holder of claim 12 wherein the primary and secondary cupholders are disposed so that one substantially overlaps the other when in the second position permitting the primary and secondary cupholders to jointly support and receive one container.

14. The container holder of claim 13 wherein the primary and secondary cupholders may alternatively assume the third position by activation of a release mechanism permitting both cupholders to receive and support different containers.

15. The container holder of claim 10 wherein the pivoting mount means is activated by a release mechanism on the primary cupholder.

16. The container holder of claim 12 further comprising a release mechanism comprising a movable button secured to the primary cupholder, a pin mounted on a spring secured to the secondary cupholder which interacts with the button.

17. The container holder of claim 10 wherein the primary and secondary cupholders further comprise at least one rubber gasket to secure containers within the cupholders.

18. A container holder comprising:
a housing having a top surface and a bottom surface;
a primary cupholder and a secondary cupholder disposed within the housing each having holder means for supporting a container disposed therein, the cupholders further having means for movably mounting both cupholders within the housing, the means for movably mounting comprising sliding mount means for permitting the cupholders to move axially from a first position substantially internal to the top and bottom surface of the housing to a second position substantially external to the top and bottom surface of the housing; and pivoting mount means for permitting the secondary cupholder to rotate about an axis from a third position where both cupholders substantially overlap to a fourth position substantially disposed away from the primary cupholder such that both cupholders may support different containers; and further wherein, the pivoting mount means is engaged by a release mechanism which comprises a movable button secured to the primary cupholder and a pin mounted on a spring secured to the secondary cupholder which interacts with the button when the secondary cupholder is in the third position.

19. The container holder comprising:
a housing having a top surface and a bottom surface;
a primary cupholder and a secondary cupholder disposed within the housing each having means for supporting a container disposed therein, the primary cupholder further having means for movably mounting the primary cupholder within the housing, the means for movably mounting comprising sliding mount means for permitting both cupholders to move axially from a first position substantially internal to the top and bottom surface of the housing where the cupholders are disposed so that one substantially overlaps the other to a second position substantially external to the top and bottom surface of the housing wherein said means comprises a rack and pinion viscous dampener mechanism; and a release mechanism comprising a movable button secured to the primary cupholder and a pin mounted on a spring secured to the secondary cupholder which interacts with the button.

20. The container holder comprising:
a housing having a top surface and a bottom surface;
a primary cupholder and a secondary cupholder disposed within the housing each having means for supporting a container disposed therein, the primary cupholder further having means for movably mounting the primary cupholder within the housing, the means for movably mounting comprising sliding mount means for permitting both cupholders to move axially from a first position substantially internal to the top and bottom surface of the housing to a second position substantially external to the top and bottom surface of the housing wherein said means comprises a rack and pinion viscous dampener mechanism; and a release mechanism comprising a movable button secured to the primary cupholder and a pin mounted on a spring secured to the secondary cupholder which interacts with the button.

* * * * *